(12) United States Patent
Wilkinson et al.

(10) Patent No.: US 6,387,985 B1
(45) Date of Patent: May 14, 2002

(54) ACRYLIC BASED FORMULATION FOR IMPROVED TEMPERATURE AND IMPACT PERFORMANCE EMPLOYING CRUSHED NATURAL STONE

(75) Inventors: Steven P. Wilkinson, Lincoln University, PA (US); Larry L. Burchfield, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/737,438

(22) Filed: Dec. 14, 2000

(51) Int. Cl.⁷ .................................................. C09D 5/29
(52) U.S. Cl. ....................... 523/171; 524/492
(58) Field of Search ........................... 523/171; 524/492

(56) References Cited

U.S. PATENT DOCUMENTS

| | | | |
|---|---|---|---|
| 3,278,662 A | 10/1966 | Mangrum | |
| 4,698,010 A | 10/1987 | Toncelli | |
| 5,321,055 A | 6/1994 | Slocum | |
| 6,265,467 B1 * | 6/2001 | Koyanagi et al. ............ | 523/171 |

* cited by examiner

Primary Examiner—Edward J. Cain
(74) Attorney, Agent, or Firm—Andrew G. Golian

(57) ABSTRACT

An acrylic and quartz based composition for surfacing material that improves temperature and impact performance over the polyester composition of the prior art.

8 Claims, No Drawings

ACRYLIC BASED FORMULATION FOR IMPROVED TEMPERATURE AND IMPACT PERFORMANCE EMPLOYING CRUSHED NATURAL STONE

BACKGROUND OF THE INVENTION

1. Field of Invention

This invention is directed to a composition for an acrylic resin that contains crushed natural stone particularly suitable for use as a countertop.

2. Description of the Related Art

Sheets of polished natural stone, such as marble or granite, are used as decorative and functional surfaces in construction applications. However, these products require expensive handling in shaping and finishing and are only available from regions remote from population centers. These factors significantly add to the already high cost of utilizing such materials. Additionally, due to imperfections, cracking and general brittleness can be encountered and the porosity of the material can lead to staining and bacterial growth.

Various synthetic-filled polymeric compositions have been described as useful for end uses such as counter tops, and floors. These synthetic materials are commercially available. Typically, these materials incorporate resin and inorganic fillers and are cured using curing systems that are actuated at room temperature or under similar ambient conditions. Certain synthetic products have become available which provide the appearance of natural marble. These so-called cultured marble products are man-made molded products generally consisting of polymeric resin, highly filled with inorganic particles and pigments. These materials can require gel coats since castings made without gel coats are susceptible to stress cracking and have a tendency to stain. Many of these materials retain the properties of the plastic matrix and are subjected to some hot water whitening due to fissure at the filler/resin bond, and/or undercured or incompletely cured resin (containing residual monomer).

Many attempts have been made to develop products having the pleasing aesthetic appearance of natural products, yet, to be substantially less expensive than the natural products. Most emphasis has been placed on the preparation of synthetic vinyl products, which are relatively inexpensive but have an appearance similar to that of the natural products. Nevertheless, attempts have been made to use natural materials in a manner by which product costs and installation problems are reduced or avoided. One such attempt is described in U.S. Pat. No. 3,278,662 to Mangrum. This reference describes a stone-containing tile product which can be mass-produced, and used to avoid the problems that generally face the installer of terrazzo products. The tile product as disclosed therein contains about 7 to about 25 percent by weight of a thermosetting polyester resin, and about 93 to about 75 percent by weight of stone particles. The components are compressed in a mold and cured; the resulting products are rigid in nature and have deficiencies that are similar to those noted with ceramic and marble tile products.

Another procedure has been commercialized by Breton S.p.A. of Castello di Godego, Italy, which developed a so-called "Breton Stone" technology. In this technology, conventional polyester resin precursors are blended at low weight percentages with aggregate to provide a relatively dry mass of material, that is vibro-compacted under vacuum and then cured to yield a rigid tile product. A process used to practice this technology is disclosed by Toncelli in U.S. Pat. No. 4,698,010. A specific polyester resin that can be used in this technology is disclosed by Slocum in U.S. Pat. No. 5,321,055. It is known to add material such as styrene to unsaturated polyester resins and, in fact, they are supplied by chemical suppliers diluted with sufficient styrene for eventual cross-linking of the polyester. The proportions supplied are usually about 70 parts by weight polyester to 30 parts by weight styrene. Such diluted polyesters provide monomer that is required for cross-linking of the polyester. These polyester compositions are disclosed for use as flooring tile. However, flooring tile does not require the heat resistance and flexural properties necessary for a countertop.

SUMMARY OF THE INVENTION

The invention is a composition for a surfacing material comprising (a) an acrylic resin matrix with cross-linking controlled by the addition of a tri-functional acrylic monomer and (b) a filler comprised of crushed natural stone.

DETAILED DESCRIPTION OF THE PREFERRED EMBODIMENTS

In typical cross-linking of the unsaturated polyesters of the prior art, cross-linking takes place between the growing styrene homopolymer and the sites of unsaturation in the polyester composition from the maleic anhydride copolymerized into the polyester backbone. The degree of cross-linking can be controlled by the concentration of maleic anhydride in the polyester composition.

In the case of the acrylic functional resins of the instant invention, the molecular weight of the acrylic oligomer is grown through copolymerization between the oligomers and the monomers such as styrene and methylmethacrylate. In the cured polymer the oligomer grows to a higher molecular weight, imparting improved mechanical properties to the polymer. The degree of cross-linking is controlled by the concentration of a tri-functional monomer. The degree of chain extension is controlled by the concentration of ethylenically unsaturated monomer. By controlling the proportions of these monomers, a cured part is made that is less stiff (lower modulus) and has an improved elongation and strain at failure. The stresses built up by the mismatch in thermal expansion coefficients between the polymer and a stone filler employed in the present invention are related to temperature. When a composite is heated, the acrylic polymer is able to relieve these stresses more easily than unsaturated polyester. It is considered that the acrylic polymer possesses a mechanical response with an improved strain to failure. The improved temperature performance with respect to crack initiation is delayed as the polymer is slightly tougher (as characterized by the work to break results) and the stresses that are built up can be absorbed more readily.

Embodiments of the stone-filled acrylic surface material of the instant invention contain, by weight, from 5% to 15% acrylic resin matrix, and 85% to 95% of a natural crushed stone filler. Preferred embodiments contain 6–10% acrylic resin matrix and 90–94% natural crushed stone.

Embodiments of the acrylic resin used as the matrix in the solid surface material disclosed above, may contain from 20% to 65%, by weight, ethylenically unsaturated monomers to promote chain extension in the resin, and from 0.5% to 10% of a tri-functional monomer to promote cross-linking in the resin. A preferred embodiment of the acrylic resin contains from 20 to 65%, by weight, of an ethylenically unsaturated monomer, 65% to 5% of an acrylic oligomer, and 15% to 30% of an acrylic polymer and 1% to 5% of a tri-functional acrylic monomer. The most preferred embodiment of the acrylic resin matrix compositions contain 60%, by weight, ethylenically unsaturated monomer, 19% acrylic polymer, 17% acrylic oligomer, 3% tri-functional acrylic monomer and the remaining 1% made up of minor constituents such as controlled amounts of additives such as initiators, activators, adhesion promoters, pigments, decorative additives, fluidizing agents, viscosity control agents, curing agents, antioxidants, catalyst and the like as are known to those of ordinary skill in the art.

Any ethylenically unsaturated monomer may be used to promote chain extension. Examples of satisfactory ethylenically unsaturated monomers are styrenes, methacrylates and acrylates, or combinations thereof. Preferred monomers are a combination of styrene, alphamethyl styrene, methylmethacrylate, and 2-phenoxyethyl acrylate.

Any tri-functional acrylic monomer may be used to promote cross-linking. The preferred tri-functional monomer is trimethylolpropane trimethacrylate.

The acrylic polymer useful in the present invention is any acrylic polymer that can be formed into high performance decorative solid surface material. Many such acrylic polymers are commercially available. A preferred polymer that meets all of the properties is poly(methyl methacrylate).

The acrylic oligomer is preferably a urethane acrylate. A number of oligomers are commercially available. They range in their backbone chemistry from polyethers to polyesters. They can be aromatic or aliphatic in nature. Some are referred to as epoxy acrylates. The end group functionality of these oligomers can be methacrylate or acrylate. The acrylate functionality is preferred, as its reactivity is more suited towards co-polymerization with the styrene monomers. Preferred oligomers are aliphatic urethane acrylates and methacrylates. Polyesters from epoxy methacrylates and epoxy acrylates and oligomeric propylene oxide, as well as oligomeric ethyleneoxide could also be used. For purposes of this invention, oligomers are short chain polymers where the molecular weight is 500–10 000 g/mole and, depending on the backbone composition, the number of repeating units in the oligomer is from 2 to 22.

Initiators may be any of the free radical producing compounds well known to the art. Peroxides are preferred such as, peroxydicarbonates, peroxyesters, and dialkyl peroxides. Azo type initiators that also thermally decompose may be used and include Vazo® 52, Vazo® 64 and Vazo® 67 (registered trademark of E.I.DuPont de Nemours & Co.).

The coupling agent is a small molecule that aids in the dispersion of a solid particulate material into a liquid medium and are of the following types: silanes, titanates and zirconates. The coupling agent preferred in the present invention is a silane in general, and SILQUEST brand product A-174 manufactured by Witco Corporation in particular.

The crushed natural stone filler may be any fragment of rock or mineral matter found in nature. Satisfactory stone fillers may be quartz, quartzite, marble, granite, feldspar and the like. The preferred stone filler is quartz. The sizes of the stone fillers are typically a combination of 6 mesh, =1.7–5.6 mm, 10 mesh, =0.6–3.35 mm, and 24 mesh =0.15–1.18 mm.

Optionally, any material may be added for a decorative effect. Decorative additives are distinguished from stone fillers primarily by the amount present in the composition. The crushed natural stone filler acts as an aggregate and must be present in the 85% to 95% quantity previously mentioned. Decorative additives such as gemstones, metal flake or filings, micas, seashells, pearls, colored or transparent polymeric particles, mirrored particles and pigments may be added in quantities according to taste or fashion. However, these quantities should never exceed 5% by weight, and preferably, should not exceed 2% by weight. The decorative additives may be thoroughly mixed with the other components or placed on the surface.

Examples 1 and 2 describe the manufacture of embodiments of the acrylic resin matrix material useful for making a stone-filled acrylic surfacing material. All parts and percentages are by weight unless otherwise indicated.

EXAMPLE 1

CN980 urethane acrylate (manufactured by Sartomer Company) was heated to 70° C. and 850 g measured out. It was mixed with 1000 g of methylmethacrylate and rolled for 2 hours. This mixture plus 1600 g of SR339 phenoxyethyl acrylate (manufactured by Sartomer Company), 950 g of Elvacite®2008 poly(methyl methacrylate) (PMMA) (registered trademark of E. I. duPont de Nemours & Co.), and 400 g of styrene were poured into a 12-liter flask at room temperature. The compound was then heated to 60° C. while constantly stirring. Once the compound reached 60° C. the mixture went from cloudy to clear. The PMMA dispersed; the mixture then cooled down with continual mixing. The vessel was cooled by ambient air, once it reached room temperature 48 g of SILQUEST A-174 silane coupling agent, and 144 g of TRIM (trimethylolpropane trimethacrylate, manufactured by Sartomer Company) was added to the flask and mixed for 20 minutes. A 500 g sample was removed for analytical purposes. Viscosity was measured as 524 cps, gel time as 165.7° C. at 34 min, and peak exothermic temperature as 85.7° C. at 44 min.

To the flask, potassium and cobalt activators were added and mixed for 30 minutes. Viscosity was measured as 600 cps. Initiator was added, t-butyl peroxy-2-ethyl hexanoate (Lupersol PDO manufactured by Elf Atochem), at 2 weight percent of the unsaturated polyester for analytical purposes and a gel time of 38.5 min. at 197.2° C., and peak exotherm temperature of 86.9° C. at 47 min was measured. The cured sample was solid without any visible trapped air.

EXAMPLE 2

This compound was mixed the same way as Example 1 except for the substitution of E10010 urethane acrylic acrylate (manufactured by Sartomer Company) for the CN980 urethane acrylic. All amounts weighed, and the process used, were the same. The first sample measured showed viscosity as 468 cps, gel time as 58.5 min. at 167.1° C., and peak exothermic temperature as 86.9° C. at 51 min. There was a large amount of trapped air in the sample. After the initiator and potassium and cobalt activators were added and mixed the analysis showed viscosity as 576 cps, the gel time was 36.5 min. at 205.9° C., and peak exotherm temperature as 86.9° C. at 51 min. The cured sample was solid without any visible trapped air.

Quartz surfacing material was made from the acrylic resins of Examples 1 and 2 as well as comparative polyester resins according to comparative examples 3 and 4.

Comparative Example 3

A test plaque was produced for testing material properties using a Breton Stone process as disclosed in the previously mentioned U.S. Pat. No. 4,698,010. A mixture of 852 g of a Malbei quartz (Mesh 6) and 454 g of Malbei Quartz (Mesh 24) was placed in a plastic bowl. To this mixture a pigment, 3.718 g of Bayer black was added and the pigment was thoroughly mixed together with the quartz. An unsaturated aromatic polyester resin, Aropol C324 (manufactured by Ashland Chemical Co.), was used as the polymer in this composite formulation. The resin was received from Ashland Chemical Co. pre-promoted with transition metal complexes to help catalyze the reaction at the elevated temperatures that decompose the thermally induced initiator. This resin was stored in a refrigerator and had 1% by weight of a silane coupling agent, Silquest-A174 (manufactured by Witco) added to the resin. A thermal initiator, t-butyl peroxy-2-ethyl hexanoate (Lupersol PDO manufactured by Elf Atochem), was added to the resin at 2 weight percent of the unsaturated polyester. This pre-formulated resin mixture (144 g) was added to the first quartz mixture and stirred to fully wet out the quartz particles. To this mixture 499 g of pulverized quartz, Silverbond 325 (manufactured by Unimin Canada) was added. This powder addition binds the quartz, wet with resin, together to provide a mixture with the consistency of wet sand. This formulation constitutes one portion of the mix. In this particular black and white recipe, this forms the black portion that is 30% by weight of the final recipe.

The second portion of the recipe is the white portion of the mix. This was created similar to the above method by 1984 g of a Malbei quartz (Mesh 6) being placed into a plastic bowl. A further 1060 g of Malbei Quartz (Mesh 24) was added to the same bowl. To this mixture a pigment, 15.3075 g of Titanium Dioxide pigment was added and the pigment thoroughly mixed together with the quartz. Aropol C324 was, again, used as the polymer resin containing similar initiators and activators as previously described. This pre-formulated resin mixture (337 g) was added to the first quartz mixture and stirred to fully wet out the quartz particles. To this mixture 1169 g of pulverized quartz, Silverbond 325(manufactured by Unimin Canada) was added. The mixture was stirred to assist the powder in binding together the quartz particles. This formulation constitutes the second portion of the mix. In this particular black and white recipe, the white portion forms 70 weight percent of the final recipe. The total mix weight was 6500 g.

The final part of the mixing process was to combine the two portions in one bowl and perform a partial mixing. In this process, the two portions are partially mixed by folding one portion into the second.

The mix was then placed into the vibro-compactor mold. The vibro-compactor mold contains a bottom steel plate 12 inches (30.48 cm)×12 inches (30.48 cm) covered with a release paper that has a silicone release coating on the surface. The mix was added to this mold and a flattened by hand in a spreading motion. A top piece of the same release paper was added to the raw material and the entire mix flattened by hand when the top plate was added. The vibro-compactor model # 7120-0000 from Breton SpA Castello di-Godgeo, Italy) was utilized to compact this raw material mix. The vibro-compactor enclosure was closed and a top plunger plate attached to a hydraulic ram was lowered onto the surface of the top plate. The mold pressure was released and added a second time. The pressure exerted on the raw material from the piston was ~1.2 Bar. A vacuum box was lowered around the mold and a vacuum pulled on the mold. The vacuum reached— 26 mmHg. After one minute under vacuum the material was vibrated at ~3500 vibrations per minute for 60 seconds. The vacuum and the pressure was released and the mold opened to remove the mass, now compacted to a size of 12 inches (30.48 cm)×12 inches (30.48)×0.75 inch (1.9 cm).

The compacted mass was heated in a curing oven for 30 minutes set at 80° C. to initiate the cure of the unsaturated polyester. The cure panel was taken to a Breton laboratory calibrator, (model P-05 #1465-0000) to remove the top and bottom release paper and to create a flat surface for polishing. The calibrator is a large disc fitted with diamond abrasive tools that removes the paper under a constant flow of running water. The panel was calibrated on both sides to create a flat panel.

The flat panel was fitted to a Breton radial arm polisher and the upper surface polished with a sequence of polishing grits. The Pads used to polish the material were 3M Metal pad #1, #3M metal pad #2, 3M resin pad #4, 3M resin pad #5. The radial arm polisher fitted with the appropriate abrasive pads was passed over the tile surface in a sequential manner as the surface roughness was reduced. The gloss of the final finish was measured with a Minolta Multi-gloss 260 gloss meter. A value as high as 70 was obtained. The test plaque was the subject of the following tests:

The 12 inch (30.48 cm)×12 inch (30.48 cm)×0.75 inch (1.9 cm) tiles were cut using a wet saw fitted with a diamond blade into 12 inch (30.48 cm)×1 inch (2.54 cm)×0.75 inch (1.9 cm) plaques. The samples were supported in a three point bend apparatus for flexure testing. The Test machine used was an Instron/Sintech model 4204 fitted with a 5000 lb. (2268 kg) load cell. The cross-head speed was (0.2) in/min (0.5 cm/min). The plaques were deformed until they broke under the three point load. The maximum load at failure (max load), strain at failure (elongation), work to break (WTB), modulus and the flexural strength to failure (stress) were all measured and reported in Table 1.

Impact Resistance

The 12 inch (30.48 cm)×12 inch (30.48)×0.75 inch (1.9 cm) tiles were cut using a saw fitted with a diamond blade into 4 inch (10.16 cm)×4 inch (10.16 cm)×0.75 inch (1.9 cm) pieces. The performance under impact testing conditions was performed using a Gardner Impact test, (similar to ASTM 3029). Typically, the failure under impact was reported for the first signs of damage (chipping, quartz particle ejection or crushing and/or front or backside cracking) resulting from the impact of the object from a given height. Data for this test is reported in Table 1 labeled as "Impact."

Temperature Performance

The temperature performance was recorded using an 800 g continuously heated steel cylinder 2 inches (5 cm) in diameter. The heated cylinder was placed on the 12 inch (30.48 cm)×12 inch (30.48 cm)×0.75 inch (1.9 cm) tile for 5 minutes at a specific temperature. This procedure was repeated at set isothermal temperatures until permanent damage (as described by cracking, yellowing, whitening, Delta E>2) was observed in the material. Data for this test is reported in Table 1 labeled as "Hot Block."

Comparative Example 4

Using the same process and parameters as in Comparative Example 3, test samples were produced using another aromatic polyester resin (32175-00, manufactured by Reichold). Also, using the same process and parameters, sample plaques were produced using the acrylic resins produced in Examples 1 and 2. The data relevant to the mechanical properties of the resulting test plaques are reported in Table 1.

TABLE 1

| | Acrylic | | Unsaturated Polyester | |
|---|---|---|---|---|
| | Example 1 Acrylic Formulation with Urethane Acrylic Oligomer CN980 | Example 2 Acrylic Formulation with Urethane Acrylic Oligomer E10010 | Comparative Example 3 Aromatic Polyester Oligomer Ashland C324 | Comparative Example 4 Aromatic Polyester Reichhold 32175-00 |
| Stress (psi) | 5174 | 5212 | 5781 | 4746 |
| Modulus (psi) | 3589046 | 4003624 | 5966801 | 5338728 |
| WTB (in.-lb) | 4.118 | 3.32 | 2.16 | 1.7 |
| Elongation (%) | 0.199 | 0.162 | 0.1025 | 0.096 |
| Max Load (lbs) | 118 | 135 | 148 | 125 |
| Impact (in-lb) | 74 | 54 | 60 | 52 |
| Hot Block (C) | >290C | >290C | 230–240 | 220 |

What is claimed is:

1. A composition for a surfacing material comprising by weight:
    (a) 5% to 15% of an acrylic resin matrix wherein the degree of cross-linking is controlled by addition of 0.5% to 10%, by weight, of a tri-functional acrylic monomer; and
    (b) 85% to 95% of a filler comprised of crushed natural stone.

2. The composition of claim 1 wherein the crushed natural stone filler is selected from the group consisting of quartz, quartzite, marble, granite, or a combination thereof.

3. A composition for a crushed-stone filled acrylic resin surfacing material comprising by weight:
    (a) 5% to 15% of an acrylic resin matrix comprised of:
        (i) 20 to 65 parts of an ethylenically unsaturated monomer; and
        (ii) 5 to 65 parts of an acrylic oligomer; and
        (iii) 15 to 30 parts of an acrylic polymer; and
        (iv) 1 to 5 parts of a tri-functional acrylic monomer, and
        (v) 1 to 2 parts peroxide initiator; and
        (vi) 0.01 to 20 parts pigment; and
        (vii) 1 to 2 parts of a silane coupling agent,
    (b) 85% to 95% of a filler comprised of crushed natural stone; and
    (c) 0% to 4% of decorative additives.

4. The composition of claim 3 wherein the crushed natural stone filler is selected from the group consisting of quartz, quartzite, marble, granite, or a combination thereof.

5. A composition for a crushed-stone filled acrylic resin surfacing material comprising by weight:
    (a) 6% to 10% of an acrylic resin comprised of:
        (i) 60 parts of an ethylenically unsaturated monomer; and
        (ii) 17 to 20 parts of an acrylic oligomer; and
        (iii) 19 to 20 parts of an acrylic polymer; and
        (iv) 3 parts of a tri-functional monomer and
        (v) 1 to 2 parts peroxide initiator; and
        (vi) 0.01 to 20 parts pigment; and
        (vii) 1 to 2 parts silane coupling agent,
    (b) 90% to 94% parts of a filler comprised of crushed natural stone; and
    (c) 0 to 2% of decorative additives.

6. The composition of claim 5 wherein:
    (a) the ethylenically unsaturated monomer is selected from the group consisting of methylmethacrylate, styrene, phenoxyethyl acrylate, or a combination thereof; and
    (b) the acrylic oligomer is urethane acrylate; and
    (c) the acrylic polymer is poly(methyl methacrylate); and
    (d) the tri-functional monomer is trimethylolpropane trimethacrylate.
    (e) the crushed natural stone is quartz.

7. A surfacing material formed by the composition of claim 1.

8. A surfacing material formed by the composition of claim 3.

* * * * *